United States Patent Office 3,832,344
Patented Aug. 27, 1974

3,832,344
PROCESS FOR PRODUCING 1-SUBSTITUTED BENZODIAZEPINE DERIVATIVES
Tadashi Okamoto, Ashiya, Takeshi Akase, Nishinomiya, Takahiro Izumi, Takarazuka, Mitsuhiro Akatsu, Ikeda, Yoshiharu Kume and Shigeho Inaba, Takarazuka, and Hisao Yamamoto, Nishinomiya, Japan, assignors to Sumitomo Chemical Company, Limited, Osaka, Japan
No Drawing. Filed Oct. 15, 1971, Ser. No. 189,754
Claims priority, application Japan, Oct. 17, 1970, 45/91,354; Nov. 7, 1970, 45/98,046, 45/98,048; Dec. 25, 1970, 45/129,009
Int. Cl. C07d 53/06
U.S. Cl. 260—239 BD                 4 Claims

ABSTRACT OF THE DISCLOSURE

1-Alkyl-substituted-1,4-benzodiazepine or 1,4-benzodiazepin-2-one derivative is prepared by alkylating corresponding 1-unsubstituted-derivative with corresponding alkyl halide or dialkyl sulfate in the presence of a hydrocarbonlithium compound. According to the process, there are prepared such valuable compounds as central nervous-controlling agents as 1-cyclopropylmethyl-5-phenyl-7-chloro - 2,3-dihydro-1H-1,4-benzodiazepine, 1-methyl-5-phenyl - 7 - chloro-2,3-dihydro-1H-1,4-benzodiazepine, 1-methyl-5-phenyl-7-chloro-1,3-dihydro - 2H - 1,4-benzodiazepin-2 - one and 1 - cyclopropylmethyl - 5 - (o-fluorophenyl)-7-chloro-1,3-dihydro - 2H - 1,4-benzodiazepin-2-one.

This invention relates to a novel process for preparing 1-substituted-1,4-benzodiazepine derivatives and salts thereof. More particularly, the present invention relates to a novel process for preparing a 1-substituted-1,4-benzodiazepine derivative represented by the general formula (I).

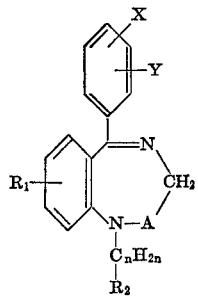

(I)

wherein A represents a carbonyl

or a methylene (—CH$_2$—) group; X and Y represent individually a hydrogen atom, halogen atom, trifluoromethyl or lower alkyl group; R$_1$ represents a hydrogen atom, a halogen atom, a trifluoromethyl or nitro group; R$_2$ represents a hydrogen atom, a lower alkyl, cycloalkyl, phthalimido, lower alkenyl, acyloxy, lower alkoxy, cyano, or trihalomethyl group, or a group of the formula

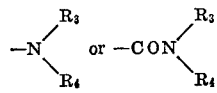

(where R$_3$ and R$_4$ represent individually a hydrogen atom, a lower alkyl or aralkyl group; or R$_3$ and R$_4$ may form with the adjacent nitrogen atom a five- or six-membered heterocylic ring which may have any substituent and may further contain additional hetero atoms in the ring); and $n$ is an integer of 1 to 4; and a salt of the said benzodiazepine derivative.

In 1-substituted-1,4-benzodiazepine derivatives represented by the above-mentioned general formula (I), the term "halogen" includes chlorine, bromine, iodine and fluorine. The expression "alkyl" means straight chain as well as branched chain alkyls; examples of "lower alkyl" include methyl, ethyl, n-propyl, isopropyl, n-butyl, isobutyl, and tert-butyl groups; examples of "lower alkenyl" include, for example, vinyl, propenyl, isopropenyl, butenyl and the like; examples of "cycloalkyl" include cyclopropyl, cyclobutyl, cyclohexyl and cyclopentyl; "lower alkoxy" includes, for example, methoxy, ethoxy, n-propoxy, isopropoxy, n-butoxy and tertiary butoxy; and "trihalomethyl" groups are, for example, trichloromethyl and trifluoromethyl groups. The alkylene group represented by —C$_n$H$_{2n}$— means straight chain as well as branched chain alkylene groups, including methylene ethylene, 1-methylethylene, 2-methylethylene, trimethylene, 1-methyletrimethylene, and 2-methyltrimethylene groups. In the case where R$_3$ and R$_4$ forms with the nitrogen atom a heterocyclic ring, the said heterocyclic group is, for example, pyrrolidino, piperidino, morpholino or piperazino group or substituted derivatives thereof. Suitable substituents include lower alkyl, phenyl, halogen-, lower alkyl- or lower alkoxy-substituted phenyl, alkoxyalkyl, alkenyloxyalkyl, carbamoyl, cyano, and acyloxyalkyl groups.

This invention relates to a process for preparing a 1-substituted-1,4-benzodiazepine derivative represented by the aforementioned general formula (I) by reacting a 1-unsubstituted-1,4-benzodiazepine derivative represented by the general formula (II),

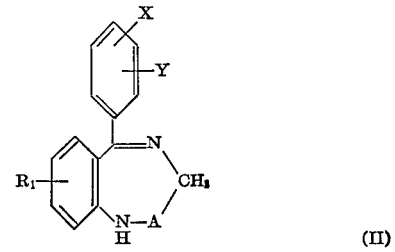

(II)

wherein A, X, Y, and R$_1$ have the same meanings as defined above, with a reactive ester of a compound represented by the general formula (III),

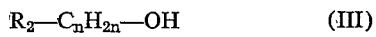

R$_2$—C$_n$H$_{2n}$—OH          (III)

wherein R$_2$ has the same meaning as defined above, in the presence of an alkyllithium or an aryllithium.

The 1-substituted-1,4-benzodiazepine derivatives represented by the afore-mentioned general formula (I), including novel compounds, have prominent effects as anti-convulsants, sedatives, muscle relaxants, or hypnotics, and are very important as medicines. This invention is to provide an improved process for preparing such valuable compounds in an industrially advantageous manner.

As is known, the 1-substituted-1,4-benzodiazepine derivatives represented by the afore-mentioned general formula (I) could be prepared by alkylation of 1-unsubstituted - 1,4 - benzodiazepine derivatives, with sodium methoxide or sodium hydride and an alkyl halide [Journal of Organic Chemistry, 28, 2456 (1963); Journal of Medicinal Chemistry, 8, 815 (1965); and British Patent Specification No. 1,148,227]. However, these preparation methods are extremely unsatisfactory from commercial point of view, since they produce impure products and the objective products of the formula (I) are obtained only in low yields. For the purification of the impure products, there is required a troublesome procedure such as chromatography or other complicated method.

Now, in accordance with the present invention, it has been found that the desired 1-substituted-1,4-benzodiazepine derivatives represented by the aforementioned general formula (I) can be obtained in good yield and a high degree of purity.

In practising this invention, 1-substituted-1,4-benzodiazepine derivatives of the aforementioned general formula (I) are produced by contacting a 1-unsubstituted-1,4-benzodiazepine derivative of the general formula (II) with an organolithium compound to form a N-1-lithium salt and then reacting the resulting lithium salt with a reactive ester of a compound of the general formula (III). The organolithium compounds used as metalating agents include alkyllithium such as butyllithium, and aryllithium such as phenyllithium. The suitable reactive esters are, in particular, hydrohalic acid esters such as the chlorides, bromides and iodides, also arylsulfonic acid esters such as p-toluene sulfonic acid ester and also sulfuric acid esters such as dimethyl sulfate and diethylsulfate. The reaction is carried out in the presence of a solvent or solvent mixture. Suitable solvents include ether, tetrahydrofuran, dioxane, benzene, toluene, xylene and the like. The reaction proceeds at a room temperature but the temperature may be lower or higher, for example, —50° to 150° C. It is preferable to carry out the reaction under an inert atmosphere, such as nitrogen or argon or the like.

The 1-substituted-benzodiazepine derivative obtained by the aforementioned process may be isolated as an acid addition salt by treatment with a mineral acid such as, for example, hydrochloric acid, sulfuric acid, nitric acid, or phosphoric acid, or with an organic acid such as acetic acid, citric acid, tartaric acid, succinic acid, maleic acid, fumaric acid, palmitic acid, or the like.

By the process of this invention, the following 1-substituted-1,4-benzodiazepine derivatives are obtained in good yields.

1-Methyl-5-phenyl-7-chloro-2,3-dihydro-1H-1,4-benzodiazepine
1-Ethyl-5-phenyl-7-chloro-2,3-dihydro-1H-1,4-benzodiazepine
1-Cyclopropylmethyl-5-phenyl-7-chloro-2,3-dihydro-1H-1,4-benzodiazepine
1-Methyl-5-(o-chlorophenyl)-7-chloro-2,3-dihydro-1H-1,4-benzodiazepine
1-Methyl-5-(o-fluorophenyl)-7-chloro-2,3-dihydro-1H-1,4-benzodiazepine
1-Methyl-5-phenyl-7-trifluoromethyl-2,3-dihydro-1H-1,4-benzodiazepine
1-Cyclopropylmethyl-5-phenyl-7-trifluoromethyl-2,3-dihydro-1H-1,4-benzodiazepine
1-Diethylaminoethyl-5-phenyl-7-chloro-2,3-dihydro-1H-1,4-benzodiazepine
1-Diethylaminoethyl-5-(o-fluorophenyl)-7-chloro-2,3-dihydro-1H-1,4-benzodiazepine
1-Dimethylaminopropyl-5-phenyl-7-chloro-2,3-dihydro-1H-1,4-benzodiazepine
1-Phthalimidoethyl-5-phenyl-7-chloro-2,3-dihydro-1H-1,4-benzodiazepine
1-Phthalimidoethyl-5-(o-chlorophenyl)-7-chloro-2,3-dihydro-1H-1,4-benzodiazepine
1-Allyl-5-phenyl-7-chloro-1,3-dihydro-2H-1,4-benzodiazepin-2-one
1-(trans-Butenyl)-5-phenyl-7-chloro-1,3-dihydro-2H-1,4-benzodiazepin-2-one
1-Methallyl-5-phenyl-7-chloro-1,3-dihydro-2H-1,4-benzodiazepin-2-one
1-(β-Methoxyethyl)-5-phenyl-7-chloro-1,3-dihydro-2H-1,4-benzodiazepin-2-one
1-(β-Methoxyethyl)-5-(o-fluorophenyl)-7-chloro-1,3-dihydro-2H-1,4-benzodiazepin-2-one
1-(β-Ethoxyethyl)-5-phenyl-7-chloro-1,3-dihydro-2H-1,4-benzodiazepin-2-one
1-(β-Ethoxyethyl)-5-(o-chlorophenyl)-7-chloro-1,3-dihydro-2H-1,4-benzodiazepin-2-one
1-(β-Ethoxyethyl)-5-(o-tolyl)-7-chloro-1,3-dihydro-2H-1,4-benzodiazepin-2-one
1-Methyl-5-(o-fluorophenyl)-7-chloro-1,3-dihydro-2H-1,4-benzodiazepin-2-one
1-Cyanomethyl-5-phenyl-7-chloro-1,3-dihydro-2H-1,4-benzodiazepin-2-one
1-(2′,2′,2′-Trifluoroethyl)-5-phenyl-7-chloro-1,3-dihydro-2H-1,4-benzodiazepin-2-one
1-(N,N-Dimethylcarbamoylmethyl)-5-(o-fluorophenyl)-7-chloro-1,3-dihydro-2H-1,4-benzodiazepin-2-one
1-(β-Diethylaminoethyl)-5-(o-fluorophenyl)-7-chloro-1,3-dihydro-2H-1,4-benzodiazepin-2-one
1-(β-Acetoxyethyl)-5-phenyl-7-chloro-1,3-hydro-2H-1,4-benzodiazepin-2-one
1-(β-Actoxyethyl)-5-(o-fluorophenyl)-7-chloro-1,3-dihydro-2H-1,4-benzodiazepin-2-one
1-(β-Diethylaminoethyl)-5-phenyl-7-nitro-1,3-dihydro-2H-1,4-benzodiazepin-2-one
1-(β-Ethoxypropyl)-5-phenyl-7-chloro-1,3-dihydro-2H-1,4-benzodiazepin-2-one
1-(δ-Methoxypropyl)-5-phenyl-7-bromo-1,3-dihydro-2H-1,4-benzodiazepin-2-one
1-(β-Methoxyethyl)-5-phenyl-7-trifluoromethyl-1,3-dihydro-2H-1,4-benzodiazepin-2-one
1-(β-Methoxyethyl)-5-(o,o′-difluorophenyl)-7-chloro-1,3-dihydro-2H-1,4-benzodiazepin-2-one
1-(β-Methoxyethyl)-5-phenyl-7-nitro-1,3-dihydro-2H-1,4-benzodiazepin-2-one
1-Cyclopropylmethyl-5-phenyl-1,3-dihydro-2H-1,4-benzodiazepin-2-one
1-Cyclopropylmethyl-5-(o-fluorophenyl)-7-chloro-1,3-dihydro-2H-1,4-benzodiazepin-2-one
1-Cyclobutylmethyl-5-phenyl-7-chloro-1,3-dihydro-2H-1,4-benzodiazepin-2-one
1-(β-Morpholinoethyl)-5-phenyl-7-chloro-1,3-dihydro-2H-1,4-benzodiazepin-2-one
1-Cyclopropylmethyl-5-phenyl-7-chloro-1,3-dihydro-2H-1,4-benzodiazepin-2-one
1-(β-Methoxypropyl)-5-phenyl-7-chloro-1,3-dihydro-2H-1,4-benzodiazepin-2-one
1-(β-Ethoxypropyl)-5-(o-fluorophenyl)-7-chloro-1,3-dihydro-2H-1,4-benzodiazepin-2-one.

A compound of the aforementioned general formula (II), wherein A is a methylene (—CH$_2$—), that is, a 1-unsubstituted - 1,4 - benzodiazepine derivative represented by the general formula (II′),

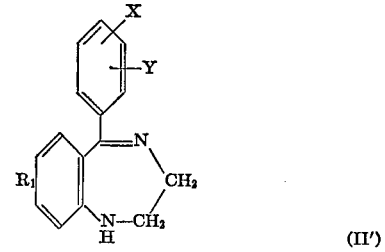

(II′)

wherein R$_1$, X and Y have the same meanings as defined above, may be prepared by hydrolyzing a 2,3-dioxopiperazinobenzophenone derivative represented by the general formula (IV),

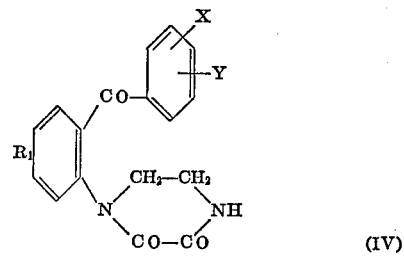

(IV)

wherein R$_1$, X and Y have the same meanings as defined above.

The 2,3-dioxopiperazinobenzophenone derivatives represented by the aforementioned general formula (IV) is heated in a solvent in the presence of a hydrolyzing agent to form 1-unsubstituted-1,4-benzodiazepine derivative represented by the general formula (II). Suitable solvents are, for example, water, methanol, ethanol and propanol, and a mixture thereof. Hydrolyzing agents include sodium hydroxide, potassium hydroxide, lithium hydroxide, sodium carbonate, and potassium carbonate and the like. The reaction is generally conducted at elevated temperatures, preferably at the boiling temperature of the solvent employed.

The 2,3-dioxopiperazinobenzophenone derivatives represented by the above general formula (IV) are novel compounds and may be prepared in good yields by, for example, oxidizing piperazino [1,2-a] indole derivatives represented by the general formula (V),

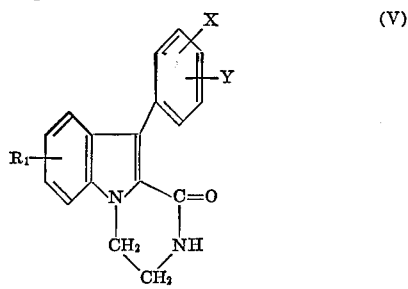
(V)

wherein $R_1$, X and Y have the same meanings as defined above.

The invention is further illustrated by the following examples of preferred embodiments thereof, which are presented for the purpose of illustration and are not intended to limit the scope of the invention.

EXAMPLE 1

A mixture of 20 g. of 2-(2″,3″ - dioxopiperazino) - 5-chlorobenzophenone and 240 g. of 95% ethanol is heated under reflux with stirring. To the mixture is added a solution of 12 g. of sodium hydroxide in 30 g. of water under reflux with stirring and the resulting mixture is stirred under reflux for one hour. To the reaction mixture is added 300 g. of water, and heated under reflux for 20 hours with stirring. Then, the reaction mixture is concentrated to remove most of ethanol. The residue is crystallized. Upon adding 300 g. of water and standing overnight at 5°–10° C. The crystals are collected by filtration and washed with 100 g. of water to give 15 g. of crude 5-phenyl-7-chloro-2,3-dihydro - 1H - 1,4 - benzodiazepine. The crude crystals are recrystallized from aqueous 70% ethanol to yield 13.2 g. of 5-phenyl-7-chloro-2,3-dihydro-1H-1,4-benzodiazepine having a melting point of 172°–173° C. An additional 0.9 gram of crystals having a melting point of 172°–173° C. is obtained from the filtrate as a second crop.

EXAMPLE 2

To a solution of 25.6 g. of potassium hydroxide in 288 ml. of water is added 30 g. of 2-(2″,3″-dioxopiperazino)-5-chlorobenzophenone and 115 g. of methanol below 40° C. The mixture is heated under reflux for 16 hours. The reaction mixture is concentrated and cooled. The precipitate is collected by filteration, washed with water and suspended in 1.9 l. of water, and 160 g. of 10% sulfuric acid is added dropwise to the mixture below 5° C. to give a solution. The solution is filtered and the filtrate is basified with 5% aqueous sodium hydroxide solution and stirred for 30 minutes. The precipitate is collected by filteration, washed with water and dried to give 21.05 g. (89.8%) of 5-phenyl-7-chloro-2,3-dihydro-1H-1,4-benzodiazepine, melting at 170°–171° C.

EXAMPLE 3

In a manner similar to that in Examples 1 and 2 but replacing 2-(2″,3″ - dioxopiperazino) - 5 - chlorobenzophenone by 2-(2″,3″-dioxopiperazino)-5-chloro-2′-fluorobenzophenone, there is obtained 5-(o - fluorophenyl)-7-chloro-2,3-dihydro-1H - 1,4 - benzodiazepine melting at 161–163° C.

EXAMPLE 4

In a manner similar to that in Examples 1 and 2, but replacing 2-(2″,3″ - dioxopiperazino) - 5 - chlorobenzophenone by 2-(2″,3″-dioxopiperazino) - 2′,5 - dichlorobenzophenone, there is obtained 5-(o-chlorophenyl)-7-chloro-2,3-dihydro-1H - 1,4 - benzodiazepine, melting at 175°–177° C.

EXAMPLE 5

In a manner similar to Examples 1 and 2, but replacing 2-(2″,3″-dioxopiperazino) - 5 - chlorobenzophenone by 2-(2″,3″ - dioxopiperazino) - 5 - trifluoromethylbenzophenone, there is obtained 5-phenyl-7-trifluoromethyl-2,3-dihydro-1H-1,4-benzodiazepine.

EXAMPLE 6

A solution of 8 g. of bromobenzene in 20 ml. of anhydrous ether is added dropwise to a mixture of 0.7 g. of lithium and 20 ml. of anhydrous ether under a nitrogen atmosphere. After completion of the addition, the mixture is stirred for 20 minutes at room temperature, and then the resulting mixture is added to a solution of 9 g. of 5-phenyl-7-chloro-2,3-dihydro-1H-1,4 - benzodiazepine in 100 ml. of anhydrous tetrahydrofuran at 15° C. under an inert nitrogen atmosphere. After the addition is over the mixture is stirred for 20 minutes at room temperature. The resulting mixture is cooled to 10° C., and a solution of 7 g. of methyl iodide in 20 ml. of ether is added dropwise thereto. After stirring for 4 hours at 20° C., the reaction mixture is concentrated to dryness under reduced pressure. To the residue, are added a 2–3% aqueous sodium chloride solution and 300 ml. of benzene and the resultant solution is mixed. The benzene layer is separated, washed twice with an aqueous sodium chloride solution, and then extracted twice with 150 ml. of 1N-hydrochloric acid. The hydrochloric acid solution is neutralized with aqueous ammonia, and extracted three times with 150 ml. of benzene. The benzene layer is washed with an aqueous sodium chloride solution, and dried over anhydrous sodium sulfate. The benzene solution is filtered through a pad, of silica gel (9 g., in 1 cm. thickness, 100–200 mesh). The silica gel pad is washed with 200 ml. of ethyl acetate. The filtrate and the washings are combined. The combined solution is concentrated to dryness under reduced pressure to give 9.1 g. of nearly pure 1-methyl-5-phenyl-7-chloro-2,3-dihydro - 1H - 1,4 - benzodiazepine. On recrystallization from hexane, there are obtained 7.7 g. of crystals of 1-methyl-5-phenyl-7-chloro-2,3-dihydro-1H-1,4-benzodiazepine, melting at 96°–97° C.

EXAMPLE 7

A solution of 8 g. of bromobenzene in 20 ml. of anhydrous ether is added dropwise to a mixture of 0.7 g. of lithium (wire cut into small pieces) and 20 ml. of anhydrous ether at 20°–30° C. under a nitrogen atmosphere. After addition is over, the mixture is stirred at room temperature for 20 minutes, and then reaction mixture is added dropwise to a solution of 9 g. of 5-phenyl-7-chloro-2,3-dihydro-1H-1,4 - benzodiazepine in 100 ml. of anhydrous tetrahydrofuran at 15° C. under a nitrogen atmosphere. The mixture is stirred at room temperature for 20 minutes and then cooled to 10° C. To the mixture is added dropwise a solution of 7 g. of methyl iodide. The mixture is stirred at 20° C. for 4 hours. The reaction mixture is concentrated to dryness under reduced pressure. The residue is dissolved in 300 ml. of benzene and washed with aqueous sodium chloride solution, and extracted with hydrochloric acid. The hydrochloric acid solution is neutralized with aqueous sodium hydroxide solution and extracted with benzene. The benzene solution is washed with aqueous sodium chloride solution, and concentrated to dryness under reduced pressure to give 9.4 g. of pale yellow oil. The oily residue is crystallized from n-hexane to give 7.9 g. of 1-methyl-5-phenyl - 7 - chloro - 2,3 - dihydro-1H-1,4-benzodiazepine, melting at 95°–97° C.

From the filtrate, there is obtained 0.5 g. of additional crystals as the second crops.

EXAMPLE 8

A mixture of 21 g. of 16.6% ether-benzene solution of phenyllithium and 20 ml. of toluene is added dropwise to a stirred suspension of 10 g. of 5-phenyl-7-chloro-2,3-dihydro-1H-1,4-benzodiazepine in a mixture of 120 ml. of toluene and 10 ml. of tetrahydrofuran at 0°–5° C. After stirring for 30 minutes, 8.3 g. of methyl iodide in 10 ml. of toluene is added to the mixture below 5° C., and the mixture was stirred at 5°–10° C. for 3 hours. The reaction mixture is diluted with 100 ml. of ice-water. The organic layer is separated, washed with aqueous sodium chloride solution and extracted with 5% sulfuric acid. The sulfuric acid layer is basified with 5% aqueous sodium hydroxide solution and extracted with toluene. The toluene extract is washed successively with water, 5% aqueous sodium bisulfite solution and then aqueous sodium chloride solution, dried over anhydrous sodium sulfate, and concentrated to dryness. The residue is crystallized from n-hexane to give 8.5 g. (80.5%) of 1-methyl-5 - phenyl - 7-chloro-2,3-dihydro-1H-1,4-benzodiazepine, melting at 102°–103° C.

EXAMPLE 9

In a manner similar to those described in Examples 6, 7 and 8, there is obtained 1-cyclopropylmethyl-5-phenyl-7 - chloro - 2,3 - dihydro-1H-1,4-benzodiazepine, having a melting point of 78°–80° C. after recrystallization from isopropyl ether.

EXAMPLE 10

In a manner similar to those described in Examples 6, 7 and 8, but using 5-(o-chlorophenyl)-7-chloro-2,3-dihydro - 1H - 1,4-benzodiazepine in place of 5-phenyl-7-chloro - 2,3 - dihydro-1H-1,4-benzodiazepine, there is obtained 1-methyl-5-(o-chlorophenyl)-7-chloro-2,3-dihydro-1H-1,4-benzodiazepine was obtained, which has a melting point of 93°–94.5° C. after recrystallization from isopropyl ether.

Similarly, the following compounds are prepared.

1 - Methyl - 5 - (o-fluorophenyl)-7-chloro-2,3-dihydro-1H-1,4-benzodiazepine, m.p. 91°–92.5° C.; 1-cyclopropylmethyl - 5-(o-chlorophenyl)-7-chloro-2,3-dihydro-1H-1,4-benzodiazepine, m.p. 88°–89° C.

EXAMPLE 11

A solution of 8 g. of bromobenzene in 20 ml. of ether is added dropwise to a mixture of 0.7 g. of lithium in fine pieces and 20 ml. of anhydrous ether, under nitrogen. The resulting solution is added dropwise to a solution of 9 g. of 5 - phenyl - 7-chloro-2,3-dihydro-1H-1,4-benzodiazepine in 90 ml. of tetrahydrofuran at 15° C. under nitrogen. After addition, the mixture is stirred for 20 minutes at room temperature, and then cooled to 10° C. To the mixture is added dropwise a solution of 6.7 g. of β-diethylaminoethyl chloride in 10 ml. of ether over a period of 5 minutes. The mixture is stirred for 4 hours at 20° C. The reaction mixture is concentrated to dryness under reduced pressure. The residue is dissolved in 200 ml. of benzene, washed with 200 ml. of water followed by an aqueous sodium chloride solution, and then extracted twice with 200 ml. of 1N-hydrochloric acid. The hydrochloric acid solution is neutralized with an aqueous sodium hydroxide solution, and then extracted with benzene and washed with water followed by an aqueous sodium chloride solution and dried over sodium sulfate, and the solvent is removed. The residue, is recrystallized from hexane to give 8.8 g. of 1-(β-diethylaminoethyl)-5-phenyl-7-chloro-2,3-dihydro-1H-1,4-benzodiazepine as an oil. The free base is dissolved in ether, and gaseous hydrogen chloride is introduced therein to precipitate its dihydrochloride. The precipitated crystals is collected by filtration, washed with ether, and then recrystallized from isopropanol to give 1-(β-diethylaminoethyl)-5-phenyl-7-chloro - 2,3 - dihydro-1H-1,4-benzodiazepine dihydrochloride as yellow crystals, melting at 234°–236° C.

EXAMPLE 12

To a solution of 9 g. of 5-phenyl-7-chloro-2,3-dihydro-1H-1,4-benzodiazepine in 90 ml. of tetrahydrofuran, is added dropwise a solution of phenyllithium in ether prepared in the same manner as in Example 11 under a nitrogen atmosphere. The mixture is stirred at 20° C. for 20 minutes and a solution of 12.5 g. of N-(2-bromoethyl) phthalimide in 30 ml. of tetrahydrofuran is added dropwise thereto at 16° C. The reaction mixture is stirred at 20° C. for 4 hours, and then the solvent is removed under reduced pressure. The residue is dissolved in benzene and washed with water followed by an aqueous sodium chloride solution, and extracted with 1N-hydrochloric acid. The hydrochloric acid extract layer is neutralized with an aqueous sodium hydroxide solution and extracted with benzene. The benzene layer is washed with water, dried over sodium sulfate, and the benzene is removed. The oily residue (16 g.) is crystallized from 100 ml. of hot cyclohexane to give 13.5 g. of 1-(2'-phthalimidoethyl) - 5-phenyl-7-chloro-2,3-dihydro-1H-1,4-benzodiazepine which is recrystallized from cyclohexane-isopropyl alcohol (2:1), m.p. 175°–176° C.

EXAMPLE 13

A solution of phenyllithium in ether prepared from 0.7 g. of lithium and 8 g. of bromobenzene is added dropwise to a solution of 8 g. of 5-phenyl-7-chloro-1,3-dihydro-2H-1,4-benzodiazepin-2-one in 100 ml. of tetrahydrofuran at 10°–15° C. under nitrogen atmosphere. After addition is over, the mixture is stirred at 10° C. for 30 minutes. To the reaction mixture, is added dropwise 7 g. of methyl iodide, and stirred at 20°–23° C. for 6 hours. Then, the reaction mixture is concentrated under reduced pressure, admixed with water, and extracted with chloroform. The chloroform layer is washed with an aqueous sodium chloride solution and dried over sodium sulfate, and the solvent is removed under reduced pressure. The residue is recrystallized from isopropanol to give 7.6 g. of 1-methyl-5-phenyl-7-chloro-1,3-dihydro-2H-1,4-benzodiazepin-2-one having a melting point of 131°–133° C.

Similarly, the following compounds are prepared.

1-Cyclopropylmethyl-5-phenyl-7-chloro-1,3-dihydro-2H-1,4-benzodiazepin-2-one, m.p. 143°–145° C.
1-Cyclopropylmethyl-5-(o-fluorophenyl)-7-chloro-1,3-dihydro - 2H - 1,4 - benzodiazepin - 2 - one, m.p. 86°–88° C.
1-(β-Diethylaminoethyl)-5-(o-fluorophenyl)-7-chloro-1,3-dihydro-2H-1,4-benzodiazepin-2-one, m.p. 82°–83° C.
1-(β-Methoxyethyl)-5-phenyl-7-chloro-1,3-dihydro-2H-1,4-benzodiazepin-2-one, m.p. 108°–109° C.

What is claimed is:

1. A process for producing 1-substituted benzodiazepine derivatives represented by the formula,

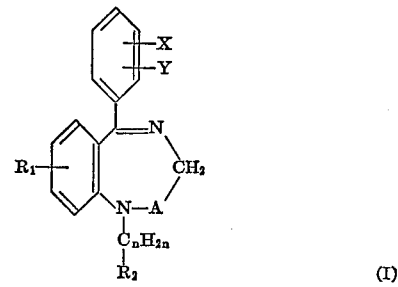

(I)

wherein A represents a group of the formula —CH$_2$—; X and Y represent individually a hydrogen atom, a halogen atom, a trifluoromethyl or a C$_1$–C$_4$ alkyl group; R$_1$ represents a hydrogen atom, a halogen atom, a trifluoromethyl or nitro group, R$_2$ represents a hydrogen atom, a C$_1$–C$_4$ alkyl cyclopropyl, cyclobutyl, cyclopentyl, cyclohexyl, phthalimido, C$_1$–C$_4$ alkenyl, C$_1$–C$_4$ alkanoyloxy, C$_1$–C$_4$ alkoxy, cyano or trifluoromethyl group or a group of the formula

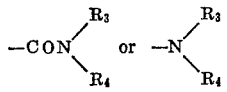

where R$_3$ and R$_4$ represent individually a C$_1$–C$_4$ alkyl, benzyl, or phenethyl group; or R$_3$ and R$_4$ may form with the adjacent nitrogen atom a pyrrolidino, piperidino, piperazino or morpholino group; and $n$ is an integer from 1 to 4; or salt thereof, which comprises treating a 1-unsubstituted-1,4-benzodiazepine derivative represented by the formula,

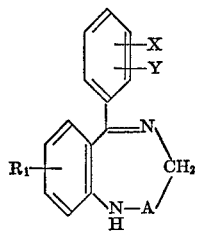

(II)

wherein A, X, Y and R$_1$ have the same meanings as defined with an organolithium compound selected from the group consisting or butyllithium and phenyllithium in the presence of a solvent or solvent mixture at a temperature ranging from —50° C. to 150° C. to form the N-lithium salt and then reacting the resulting lithium salt with a reactive ester, said ester formed by reacting a compound represented by the formula,

R$_2$—C$_n$H$_{2n}$—OH (III)

wherein R$_2$ and $n$ have the same meanings as defined above with an acid selected from the group consisting of hydrohalic acid, arylsulfonic acid and sulfuric acid.

2. A processing according to claim 1 wherein a 1-substituted-1,4-benzodiazepine derivative represented by the formula,

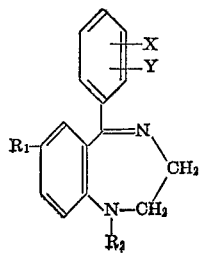

(I-a)

wherein X is hydrogen atom; Y is hydrogen or halogen atom or trifluoromethyl group; R$_1$ is hydrogen atom or halogen atom or trifluoromethyl group and R$_2$ is the grouping —C$_n$H$_{2n}$—R$_3$ (where R$_3$ is di-C$_1$–C$_4$ alkylamino or phthalimido group; $n$ is an integer of 1 to 3) is prepared by treating an 1-unsubstituted-1,4-benzodiazepine derivative represented by the formula,

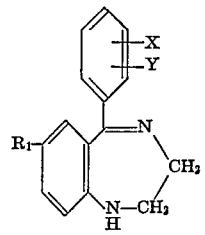

(II-a)

wherein X, Y and R$_1$ are the same as defined above, with an organolithium compound selected from the consisting of butyllithium and phenyllithium in the presence of a solvent or solvent mixture at a temperature ranging from —50° C. to 150° C. to form the N-lithium salt and then reacting the resulting lithium salt with a reactive ester, said ester formed by reacting a compound represented by the formula,

R$_2$—OH wherein R$_2$ is the same as defined above with an acid selected from the group consisting of hydrohalic acid, arylsulfonic acid and sulfuric acid.

3. A process according to claim 1, wherein A is

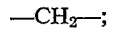

—CH$_2$—;

X and Y are hydrogen; R$_1$ is chlorine; R$_2$ is hydrogen; $n$ is 1; said organolithium compound is the reaction product or bromobenzene and lithium and said reactive ester is methyl iodide.

4. A process according to claim 1, wherein said reactive ester is a compound of the formula,

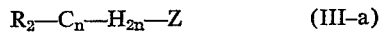

R$_2$—C$_n$—H$_{2n}$—Z (III-a)

wherein R$_2$ and $n$ are the same as defined in claim 1 and Z is a halogen atom.

References Cited
UNITED STATES PATENTS 3,299,053   1/1967   Archer et al. _____ 260—239.3
3,391,138   7/1968   Archer et al. _____ 260—239.3

JOSEPH A. NARCAVAGE, Primary Examiner

U.S. Cl. X.R.

260—239.3 D, 268 DK, 999